United States Patent [19]
Okutsu et al.

[11] Patent Number: 5,708,894
[45] Date of Patent: Jan. 13, 1998

[54] SHEET FILM PACK

[75] Inventors: Taro Okutsu; Yoshio Hara, both of Kanagawa, Japan

[73] Assignee: Fuji Photo Film Co., Ltd., Kanagawa, Japan

[21] Appl. No.: 751,322

[22] Filed: Nov. 18, 1996

[30] Foreign Application Priority Data

Nov. 27, 1995 [JP] Japan .................................. 7-307689

[51] Int. Cl.[6] .................................................. G03B 17/26
[52] U.S. Cl. ........................... 396/518; 396/522; 396/524
[58] Field of Search ................................. 396/517, 518, 396/522, 523, 524

[56] References Cited

U.S. PATENT DOCUMENTS 4,821,055  4/1989  Loose et al. .......................... 396/522
5,448,324  9/1995  Okano et al. .......................... 396/518

*Primary Examiner*—A. A. Mathews
*Attorney, Agent, or Firm*—Sughrue, Mion, Zinn, Macpeak & Seas, PLLC

[57] ABSTRACT

A sheet film pack has a pack housing for receiving a plurality of sheet film units in a stack, and a sliding lid for closing an opening of the pack housing, through which a topmost sheet film unit of the stack is moved to an exposure position outside the sheet film pack. The sliding lid has a grip that extends beyond the pack housing in the closed position to close the opening. The sliding lid also has a protuberance that protrudes from an inside surface in the vicinity of the grip. The protuberance is engaged with an edge of the pack housing when the sliding lid is in the closed position, to ensure light-tight contact of the lid with the pack housing even when a large load is applied to the grip.

5 Claims, 12 Drawing Sheets

SHEET FILM PACK

BACKGROUND OF THE INVENTION

1. Field of the Invention

The present invention relates to a sheet film pack containing a plurality of sheet films in a stack therein. The sheet films can be exposed in turn with a camera when the sheet film pack is loaded in a pack holder attached to the camera. In particular, the present invention relates to a sheet film pack wherein contained sheet film units are reliably shielded from ambient light.

2. Background of the Invention

A sheet film pack which contains a plurality of sheet film units which are each constituted of a 4×5 inch sheet of photographic film held in a film sheath. The sheet film pack is loaded in a pack holder which is attached to a large format camera, to permit exposing the sheet films one after another. JPA 5-341379 discloses a sheet film pack and a pack holder, wherein the sheet film pack is consituted of a pack housing for holding a stack of sheet film units and a sliding lid slidable to open and close an open side of the pack housing. Each time the sliding lid opens the open side of the pack housing, a sheet film unit disposed directly behind the sliding lid is pushed to an exposure position of the pack holder through the open side of the pack housing. The exposed sheet film unit is transferred to the opposite side of the stack from the open side of the pack housing in response to a reciprocating movement of the sheet film pack relative to the pack holder. At that time, the sliding lid closes the open side of the pack housing to shield the sheet film units from ambient light. Thus, the sheet film units are placed in the exposure position one after another by operating the sliding lid. To ensure the light-shielding, a plush ribbon is provided on a surface of the pack housing on which the sliding lid is sliding.

When loading the sheet film pack in the pack holder, it is desirable to grip opposite lateral sides of the sheet film pack. However, the users tend to grip a handle of the sliding lid alone to load the sheet film pack in the pack holder, especially when they are in haste. The load applied to the sliding lid at that time can be so large that the sliding lid warps to partly enlarge the gap or play between the sliding lid and the pack housing. Then, the light-trapping plush ribbon cannot sufficiently shield the interior of the pack housing from ambient light.

SUMMARY OF THE INVENTION

In view of the foregoing, the present invention has an object to provide a sheet film pack which is improved in light-tightness between the sliding lid and the pack housing.

To achieve the above object, a sheet film pack according to the present invention is comprised of a pack housing for receiving a plurality of sheet film units in a stack therein; an opening formed through one side of the pack housing to allow a topmost one of the stack of sheet film units to move to an exposure position out of the pack housing; a lid slidable on the one side of the pack housing between a closed position to close the opening in a light-tight fashion and an open position to fully open the opening; a grip integrally formed in a leading end of the lid with respect to a sliding direction toward the open position, the grip extending beyond a leading end of the pack housing in the sliding direction when the lid is in the closed position; and at least a protuberance protruding from an inside surface of the lid in proximity to a middle portion of the grip, the protuberance being brought into engagement with an edge formed in the leading end of the pack housing when the lid moves in the closed position. Thereby, the lid is reliably maintained in light-tight contact with the pack housing, even when a large load is applied to the grip.

According to a preferred embodiment of the invention, the protuberance has a groove whose sectional profile is complementary to a sectional profile of the edge.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present. In the drawings, like reference numerals designate like or corresponding parts throughout the several views, and wherein.

DETAILED DESCRIPTION OF THE PREFERRED EMBODIMENT

Figure 1:
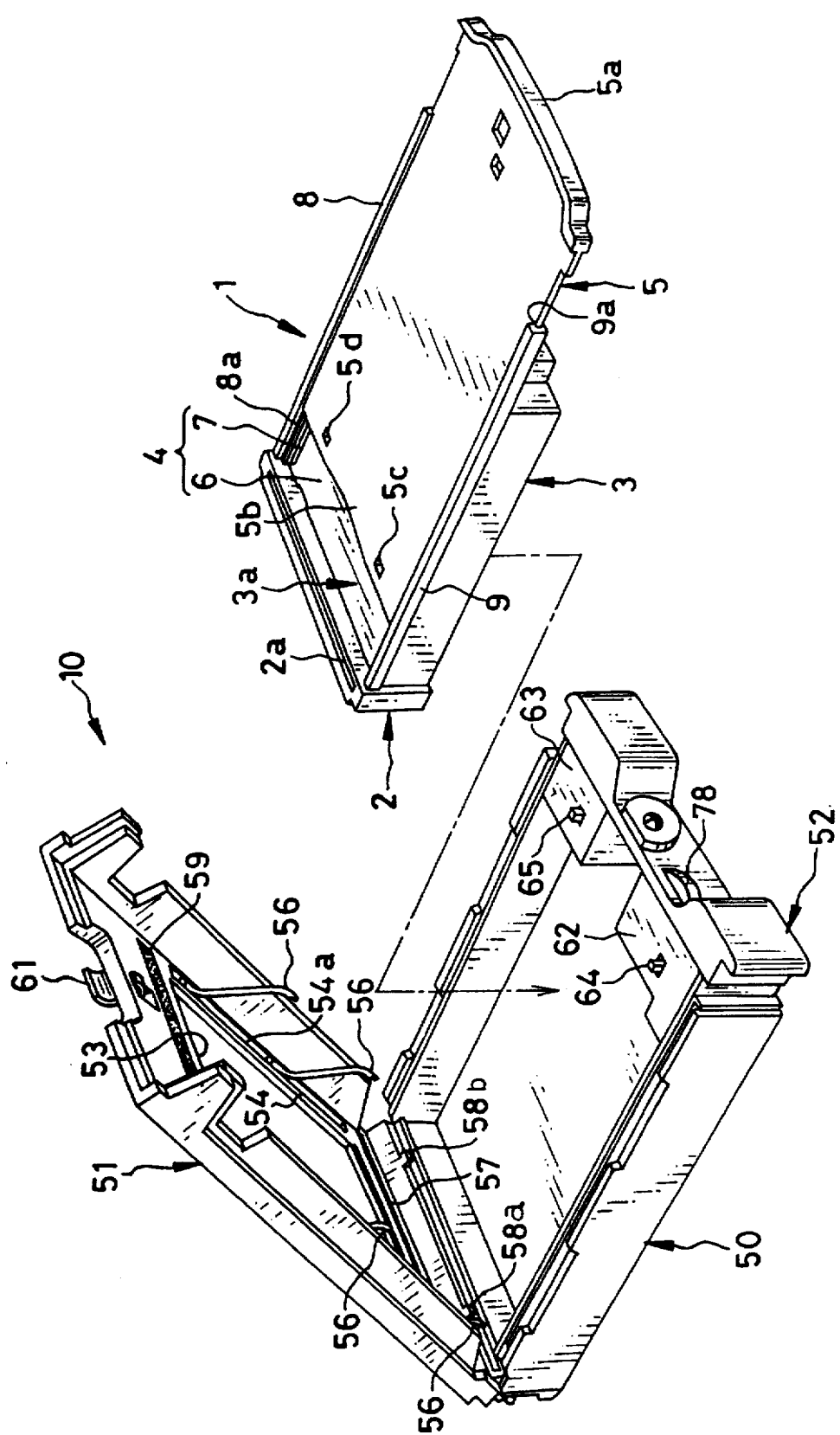
FIG. 1 is an exploded perspective view of a sheet film pack and a pack holder for holding the sheet film pack, according to an embodiment of the invention.
Figure 2:
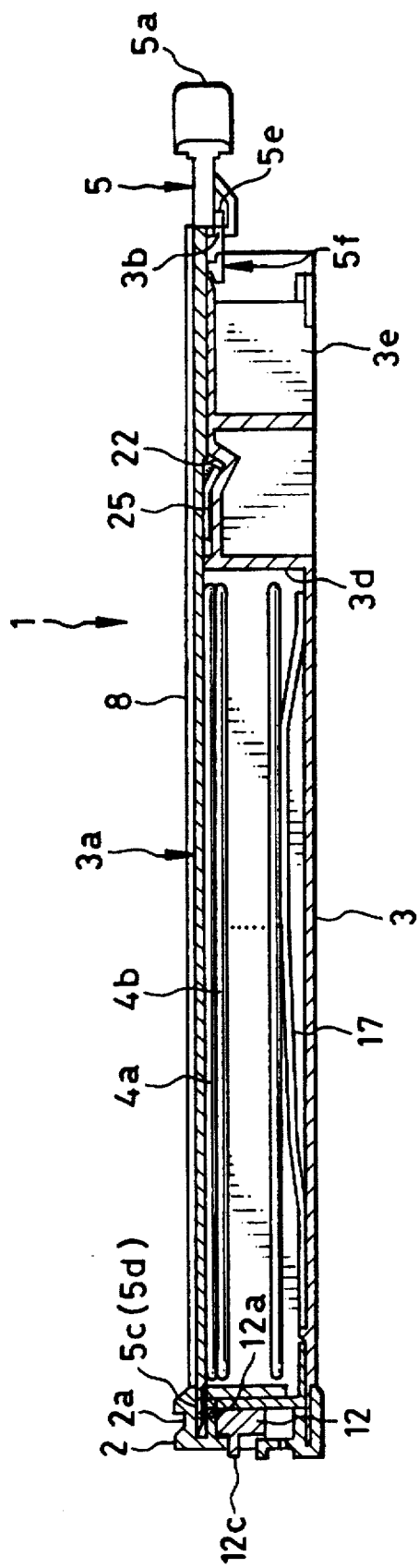
FIG. 2 is a sectional view of the sheet film pack in an inactive position wherein a sliding lid securely closes an opening of a pack housing.

In an embodiment shown in FIG. 1, a sheet film pack 1 is comprised of a pack housing 3 having a cap 2 removably attached to a trailing end of the pack housing 3, a plurality of, e.g. eight, sheet film units 4 stacked in the pack housing 3, and a sliding lid 5 for opening and closing an opening 3a formed on the front, i.e. the top side in FIG. 1, of the pack housing. The sheet film unit 4 is comprised of a 4×5 inch sheet film 6 and a plastic sheath 7 for holding the sheet film 6. The sliding lid 5 has a grip 5a on one end thereof. The grip 5a protrudes from an end 3b of the pack housing 3 in a closed position to fully close the opening 3a, as shown in FIG. 2. The lid 5 can be slid by hand in grooves 8a and 9a of guide rails 8 and 9 which are formed along longitudinal side walls of the pack housing 3.

The sliding lid 5 has a pair of holes 5c and 5d in the vicinity of a trailing end 5b that is opposite from the grip 5a. When the sheet film pack 1 is not loaded in a pack holder 10, the sliding lid 5 is locked in the closed position with the holes 5c and 5d being engaged with a pair of claws 12a of a fastening member 12 of the cap 2, as shown in FIG. 2. In the closed position, a lateral ridge 5e that is formed on an inside of the sliding lid 5 in proximity to the grip 5a is in contact with the leading end 3b of the pack housing 3, as shown in detail in FIG. 3.

Figure 3:
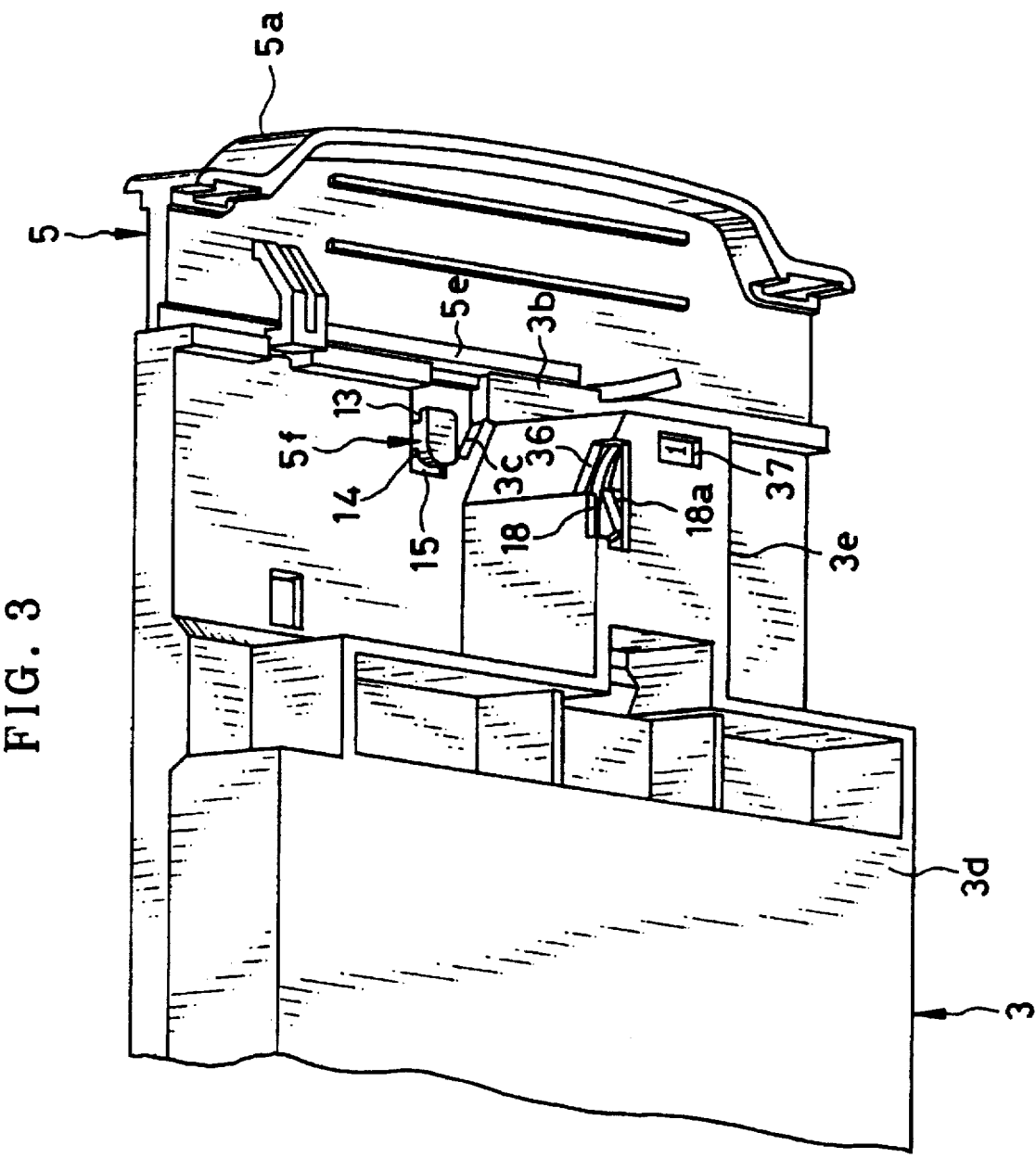
FIG. 3 is a fragmenary perspective view from the bottom of the sheet film pack.
Figure 4:
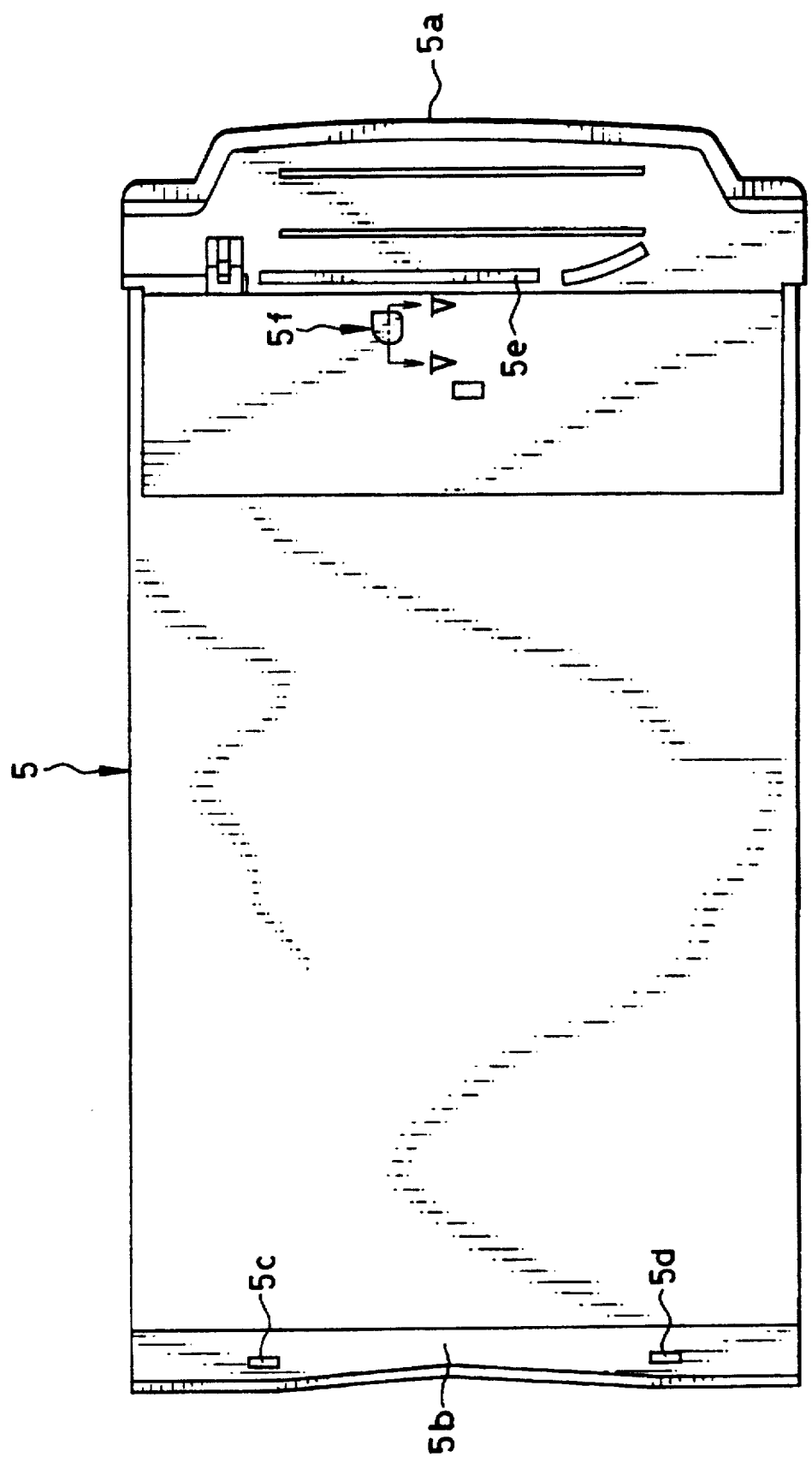
FIG. 4 is a plan view of the sliding lid viewed from inside thereof.
Figure 5:
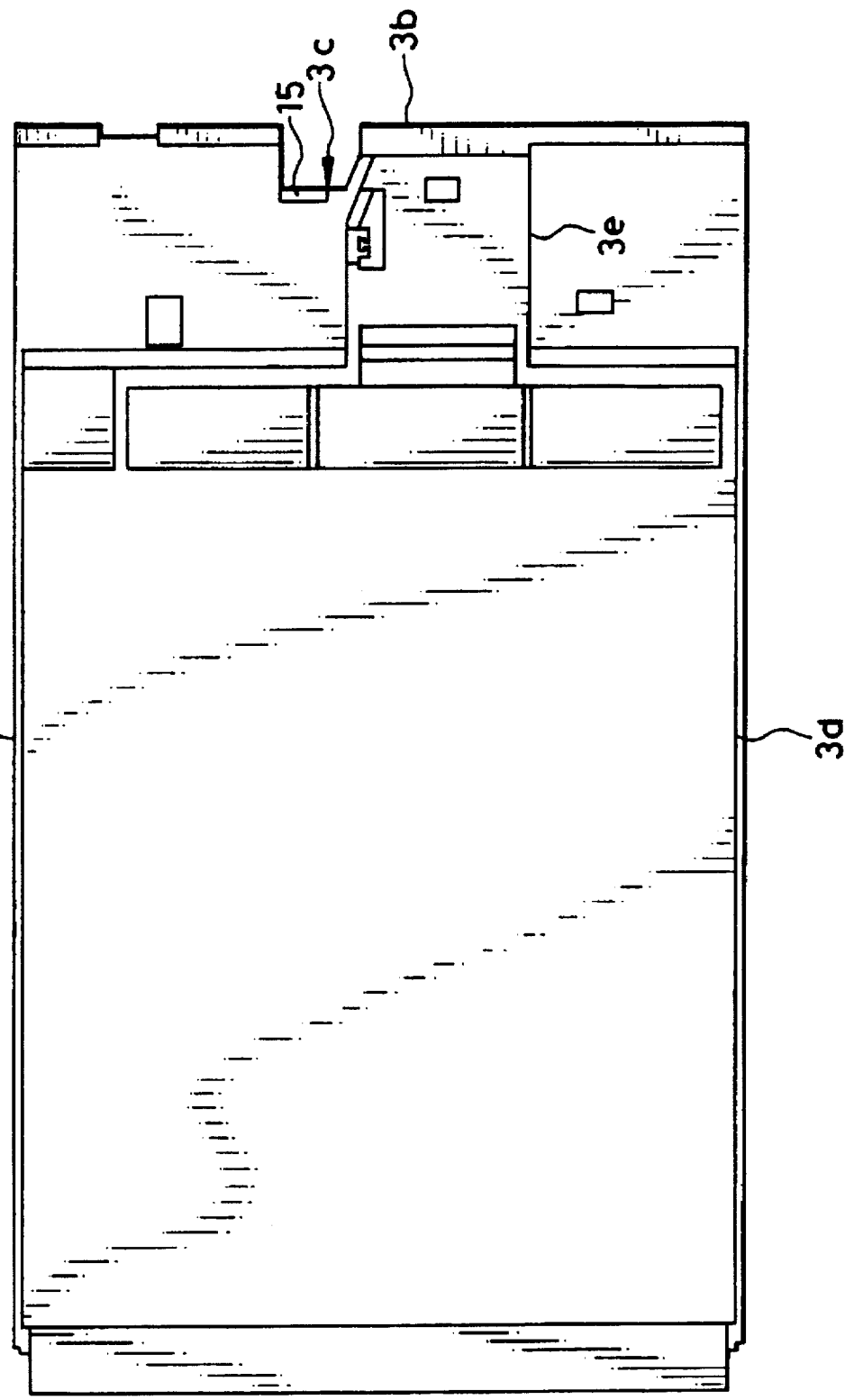
FIG. 5 is a bottom plan view of the pack housing.

As shown in FIGS. 3 to 5, a protuberance 5f is formed in proximity to the lateral ridge 5e at a middle position in the lateral direction of the sliding lid 5, and a cutout 3c is formed in the vicinity of the leading end 3b of the pack housing 3, to accept the protuberance 5f in the closed position. As shown in detail in FIGS. 6 and 7, the protuberance 5f is provided with engaging grooves 13 and 14, one 13 of which faces to the grip 5a and the other 14 faces to the trailing end 5b of the sliding lid 5. The groove 14 on the side of trailing end 5b has a substantially triangular sectional profile to engage with a wedge-shaped edge 15 of the cutout 3c. According to this configuration, a gap or play between the sliding lid 5 and the pack housing 3 decreases as the engagement between the groove 14 and the edge 15 becomes deeper. When the sliding lid 5 is finally locked in the closed position, the sliding lid 5 comes into tight contact with the pack housing. 3. In this condition, even if a large load is applied to the grip 5a, the sliding lid 5 would not warp to separate from the pack housing 3. Thus, the sheet film units 4 inside the sheet film pack 1 are reliably shielded from ambient light that could otherwise enter through the gap between the sliding lid 5 and the pack housing 3. The groove 13 of the protuberance 5f on the side of the grip 5a is brought into engagement with a particular member of the pack holder 10 after one of the sheet film units 4 is placed in an exposure position, to secure the sliding lid 5 and the pack housing 3 to a sliding tray 52 of the pack holder 10.

Figure 7:
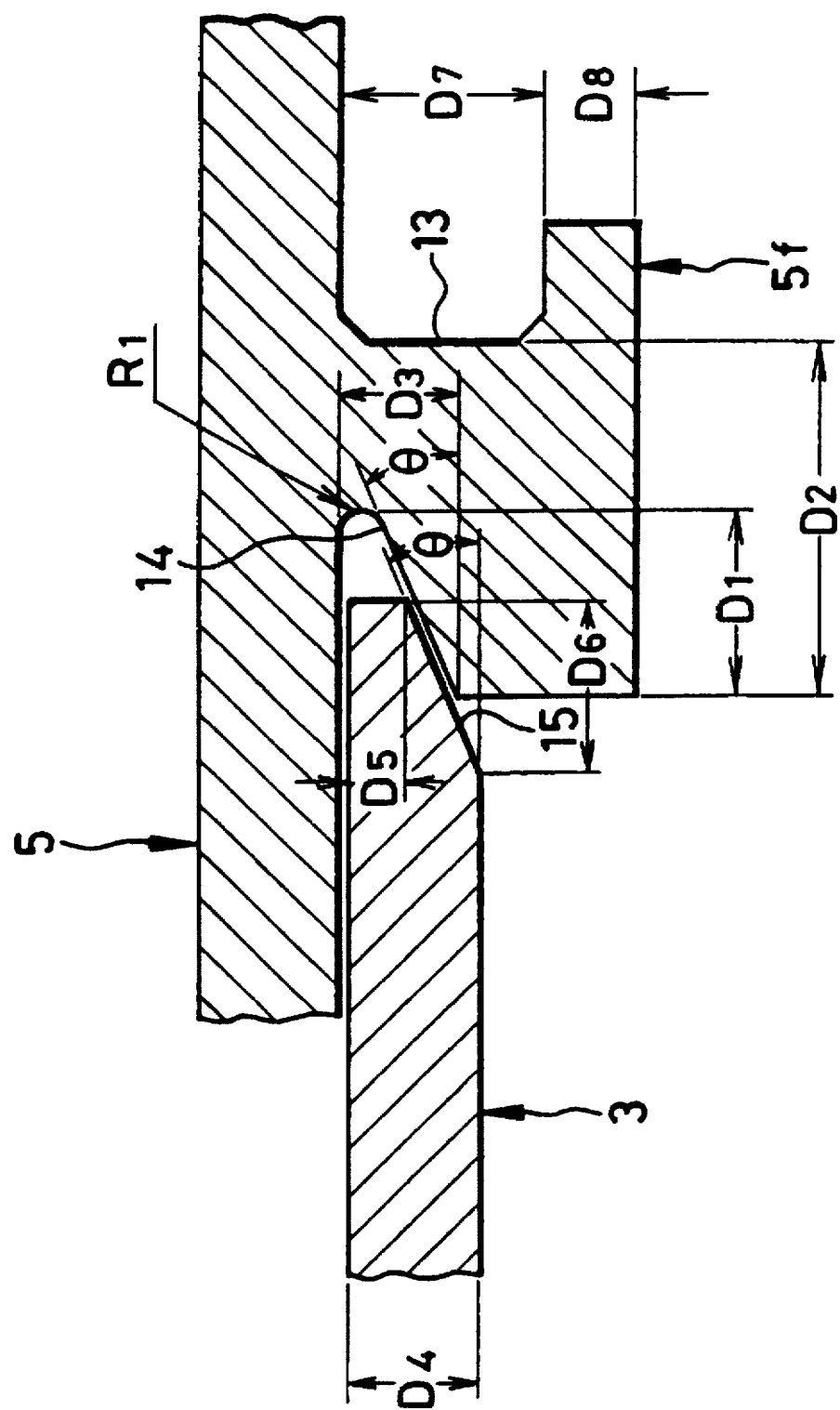
FIG. 7 is an enlarged sectional view taken along line V—V of FIGS. 4 and 6, illustrating engagement between a groove of a protuberance of the lid and an edge of the pack housing.

Referring to FIG. 7, because the depth of engagement between the groove 14 and the edge 15 increases with the depth D1 of the groove 14, the larger depth D1 is preferable for the firmer engagement. But the larger the depth D1 of the groove 14, the thinner the stem of the protuberance 5f, so the protuberance 5f becomes the weaker. It is proved that the depth D1 is preferably from 1.6 mm to 2.4 mm, and more preferably from 1.8 mm to 2.2

Figure 6:
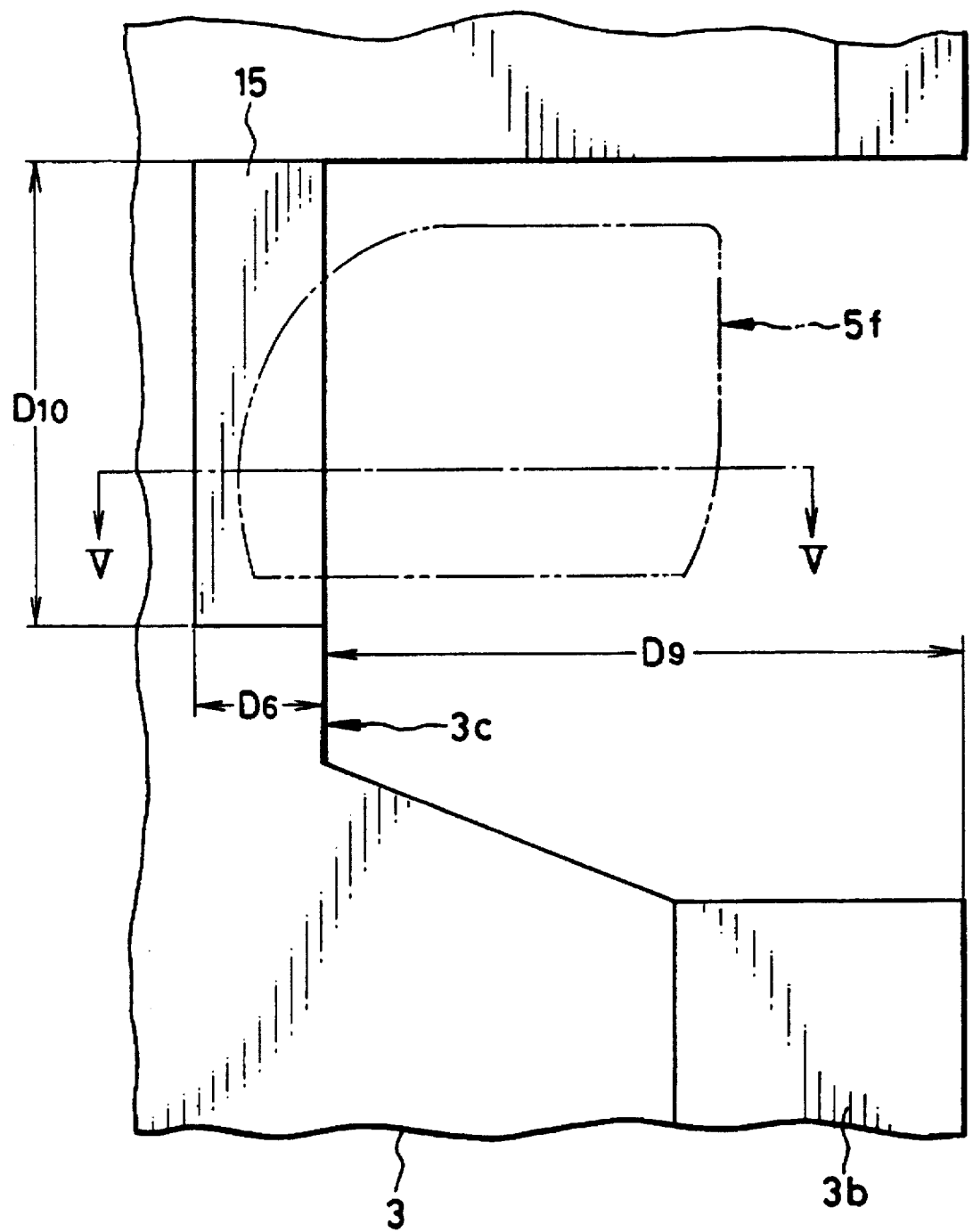
FIG. 6 is an enlarged view of the pack housing, illustrating a cutout having the edge to be engaged with the protuberance.

According to the present embodiment, the depth D1 is 2.0 mm, whereas the length D2 from a forward end of the protuberance to a bottom of the rearward groove 13 is 3.3 mm. The sectional profile of the forward groove 14 is substantially complimentary to that of the edge 15, so the inclination angle θ is 22°. The bottom of the groove 14 is rounded with a radius of curvature R1 of 0.3 mm. The length D3 from the inside surface of the sliding lid 5 to the brink of the groove 14 is 1.3 mm, whereas the thickness D4 of the pack housing 3 is 1.4 mm, that is a little more than the length D3. The wedge-shaped edge 15 is tapered from the thickness D4 to a tip having the thickness D5 of 0.7 mm. The width D6 of the tapered or inclined surface of the edge 15 is 1.9 mm. The length D7 from the inside surface of the sliding lid 5 to the brink of the rearward groove 13 is 2.2 mm, and the length D8 from the brink of the rearward groove 13 to the most protruding surface of the protuberance 5f is 1.0 mm. On the other hand, as shown in FIG. 6, the depth D9 of the cutout 3c is 9.3 mm, and the length D10 of the wedge-shaped edge 15 is 6.84 mm.

It is preferable to form the sliding lid 5 from a material having physical properties as shown in TABLE. According to the present embodiment, polycarbonate superior in flowability and mold release property is used.

TABLE

| ITEM | METHOD OF MEASUREMENT | UNIT | PHYSICAL VALUE |
| --- | --- | --- | --- |
| TENSILE STRENGTH | | | |
| AT YIELD POINT | | kg/cm$^2$ | 435–80 |
| AT BREAK | ASTM D-638 | | 490–910 |
| ELONGATION AT BREAK | | % | 75–140 |
| FLEXURAL STRENGTH | ASTM D-790 | kg/cm$^2$ | 630–1170 |
| IZOD IMPACT STRENGTH | ASTM D-256 | kg · cm/cm | |
| WITH NOTCH ½" | | | 7–13 |
| WITH NOTCH ¼" | | | 63–117 |
| MFI | JIS K7210 | g/10 min | 10–18 |
| CARBON CONTENT | | % | 0.2–5.0 |

Referring again to FIG. 2, a plate spring 17 is mounted on the bottom of a film chamber 3d to urge the sheet film units 4 stacked thereon toward the opening 3a. The pack housing 3 also has a counter chamber 3e between the leading end 3b and the film chamber 3d, to accommodate a counter disc 18, as is shown in FIG. 3. A V-shaped recess 22 is formed on a surface of the pack housing 3 between the counter chamber 3e and the film chamber 3d, which the sliding lid 5 slides on, and a light-trapping plush 25 is cemented at its one end to a slope of the V-shaped recess 22, to prevent ambient light from entering through the gap between the sliding lid 5 and the pack housing 3.

As shown in FIG. 1, the pack holder 10 is constructed of a holder housing 50, a cover 51 hinged to the holder housing 50, and the sliding tray 52 slidable in the holder housing 50. The cover 51 has an exposure aperture 53 having a smaller size than the sheet film unit 4. The inside surface of the cover 51 around the exposure aperture 53 serves as a receiving surface 54 for receiving the obverse or photosensitive surface of the sheet film unit 4, thereby positioning the sheet film unit 4 in a designated exposure position. Four leaf springs 56 are mounted on the cover 51 with each end thereof secured in longitudinal grooves 54a formed outside the receiving surface 54. When the cover 51 is closed after the sheet film pack 1 is loaded in the pack holder 10, the leaf springs 56 urge the sheet film pack 1 rearward, that is, downward in FIG. 1. The leaf springs 56 also urge the sheet film unit 4 rearward when the sheet film unit 4 is in the exposure position, as will be described in detail later.

Figure 8:
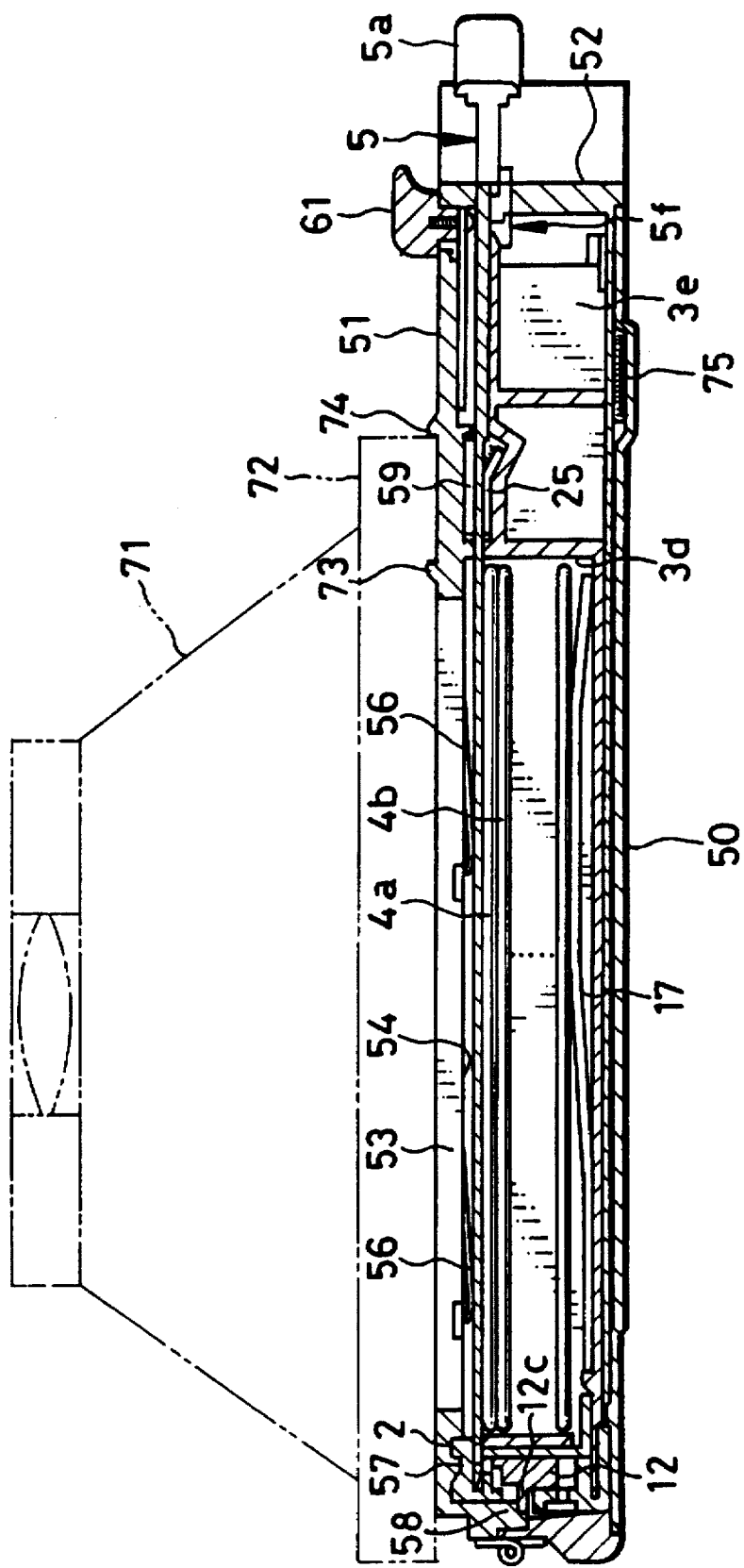
FIG. 8 is a sectional view of the sheet film pack in an initial operative position loaded in the pack holder which is attached to an exposure frame of a camera.

The cover 51 further has a lateral ridge 57 and a pair of projections 58a and 58b in the vicinity of the hinged end. The ridge 57 is brought into engagement with a lateral groove 2a of the cap 2 when the sheet film pack 1 is loaded and the cover 51 is closed. Thereby the cap 2 is held in the pack holder 10. Also when the cover 51 is closed, the projections 58a, 58b push down a pair of projections 12c of the fastening member 12, thereby disengaging the claws 12a from the holes 5c and 5d of the sliding lid 5, as shown in FIG. 8. A light-trapping plush 59 is provided on the inside surface of the cover 51 in the vicinity of a free end opposite to the hinged end, for preventing ambient light from entering through a gap between the cover 51 and the sliding lid 5. A knob 61 is slidably mounted on the free end of the cover 51. The knob 61 is operated to open and close the cover 51 when loading and unloading the sheet film pack 1.

A pair of chambers 62 and 63, which are formed in leading end portions of the sliding tray 52, accommodate a latch mechanism for controlling the motion of the sliding tray 52 relative to the holder housing 50, and a counter advancing mechanism for advancing the counter disc 18 of the sheet film pack 1 step by step. Projections 64 and 65 protruding upward from the chambers 62 and 63 are adapted to engage in the holes 5c and 5d to stop the sliding lid 5 from being pulled out further from a position where the opening 3a is fully open. As shown in FIG. 8, positioning ridges 72 and 74 are formed on the front surface of the pack holder 10, i.e., on the top of the cover 51 in the drawings, for positioning the pack holder 10 with respect to an exposure frame 72 of a large-format camera 71. Designated by 75 is a light-trapping plush for preventing ambient light from entering through a gap between the sliding tray 52 and the inside surface of the holder housing 50.

To load the sheet film pack 1 in the holder 10, the holder 10 is put on a horizontal portion such as on a desk. After opening the cover 51, the photographer holds the opposite sides of the sheet film pack 1 to put it down on the sliding tray 52 inside the holder housing 50 while keeping the sheet film pack 1 in a horizontal state. However, it is possible that the photographer merely gasps the grip 5a to load in the pack holder 10. Although a large load is applied to the sliding lid 5 at that time, since the groove 14 of the protuberance 5f is engaged with the edge 15 of the cutout 3c, the sliding lid 5 is hardly warped and is maintained in tight contact with the pack housing 3. Therefore, no ambient light can enter through between the sliding lid 5 and the pack housing 3.

Figure 9:
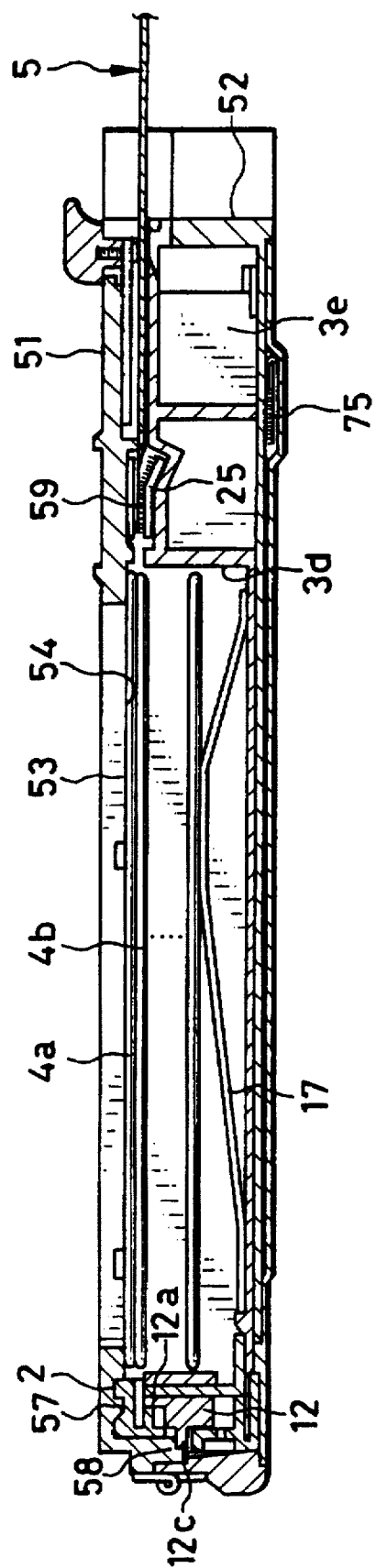
FIG. 9 is a view similar to FIG. 8, but illustrating the sheet film pack and the pack holder in an operative position wherein the sliding lid is drawn out from the sheet film pack to fully open the opening of the pack housing.

When the sheet film pack 1 is loaded and the cover 51 is closed, the ridge 57 is brought into engagement with the lateral groove 2a of the cap 2, to arrest the cap 2 in the pack holder 10. Also when the cover 51 is closed, the projections 58 push down the projections 12c of the fastening member 12, thereby disengaging the claws 12a from the holes 5c and 5d of the sliding lid 5, as shown in FIG. 8. In this condition, the sliding lid 5 is allowed to move along the guide rails 8 and 9 of the pack housing 3. Then, the pack holder 10 is attached to the exposure frame 72 of the camera 71. Thereafter, the sliding lid 5 is pulled out till the holes 5c and 5d are caught on the projections 64 and 65. In this position, the opening 3a is fully opened as shown in FIG. 9, so that a topmost sheet film unit 4a is pushed out of the film chamber 3d through the opening 3a under the force of the plate spring 17, and is pressed on the receiving surface 54. The sliding tray 52 is secured to the holder housing 50 by the latch mechanism contained in the chamber 62, so that the sliding tray 52 may not slide along with the sliding lid 5.

Figure 10:
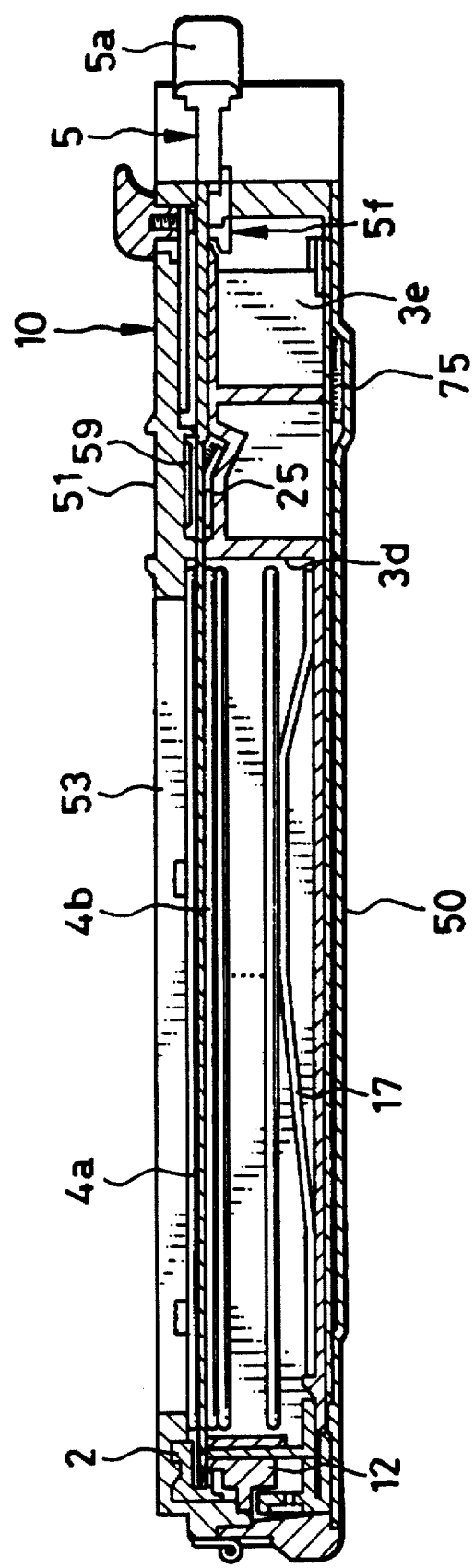
FIG. 10 is a view similar to FIG. 8, but illustrating the sheet film pack and the pack holder in an exposure position.
Figure 11:
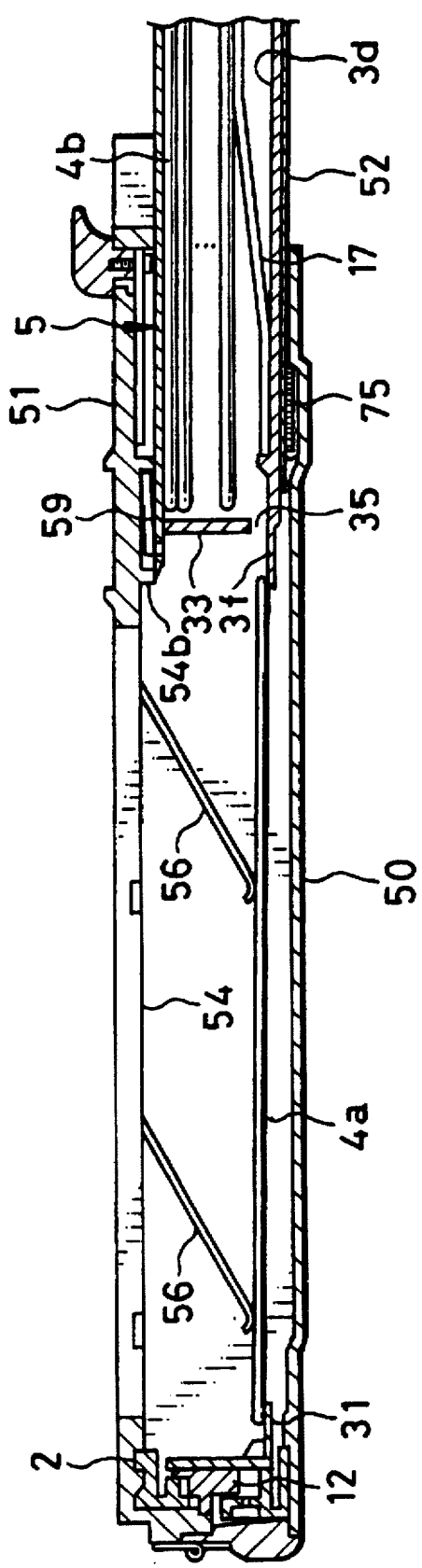
FIG. 11 is a view similar to FIG. 8, but illustrating a position wherein the sheet film pack and a sliding tray of the pack holder are drawn out from a holder housing, to transfer an exposed sheet film unit to the bottom of the pack housing.

Thereafter when the photographer pushes the sliding lid 5 back to the initial closed position, the sliding lid 5 is inserted between the topmost sheet film unit 4a and the next sheet film unit 4b, as shown in FIG. 10. Thereby, the sheet film unit 4a is maintained evenly positioned in the exposure position. Simultaneously, the latch mechanism in the chamber 62 is brought into engagement with the groove 13 of the protuberance 5f to fasten the sliding lid 5 and thus the pack housing 3 to the sliding tray 52. At the same time, the latch mechanism releases the sliding tray 52 from the holder housing 50. Then, an indicia appears in a not-shown window formed in a semi-circular tab 78 of the sliding tray 52, to indicate that it is ready for an exposure. After the first sheet film unit 4a is exposed by releasing a shutter of the camera 71, the sliding lid 5, the pack housing 3 and the sliding tray 52 are pulled out together from the holder housing 50 by pulling the grip 5a, while the cap 2 is left in the pack housing 50 because of the engagement between the groove 2a and the ridge 57, as shown in FIG. 11. A not-shown mechanism stops the sliding tray 52 from being pulled out further from the position shown in FIG. 11. Since the sliding lid 5 securely closes the opening 3a at that time, the sheet film units 4 in the pack housing 3 are shielded from ambient light.

On the other hand, the exposed sheet film unit 4a is stopped from moving together with the sliding lid 5 by virtue of a lateral ridge 54b of the receiving surface 54. The sheet film unit 4a left in the holder housing 50 is pushed by the leaf springs 56 to a rear position of the holder housing 50, i.e., a bottom position in the drawings, that is defined by an L-shaped plate 31 of the cap 2 and a trailing end 3f of the bottom wall of the film chamber 3d. Thereafter when the sliding tray 52 and the pack housing 3 are moved back into the holder housing 50, by pushing the grip 5a, the exposed sheet film unit 4a whose trailing end is confined by the L-shaped plate 31 is inserted back into the pack housing 3 through a recovery mouth 35 formed between the bottom wall and a rear wall 33 of the film chamber 3d. The sheet film unit 4a passing through the recovery mouth 35 rides on the plate spring 17 to be positioned at the bottom of the stack of sheet film units 4.

When the film pack 1 is completely inserted back into the holder housing 50 after the exposure, the counter advancing mechanism in the chamber 62 rotates the counter disc 18 by one increment by actuating a ratchet 18a of the counter disc 18 that is accessible through a cutout 36 of the counter chamber 3e. As a result, the film number "2" is displayed in a counter window 37 formed through the bottom of the counter chamber 3e. The film number is visible through a not-shown counter window of the pack holder 10. In this way, the film pack 1 and the pack holder 10 are returned to the initial operative position as shown in FIG. 8, except for the order of the stacked sheet film units 4, that is, the second sheet film unit 4b is now in contact with the inside surface of the sliding lid 5 and the first sheet film unit 4a is at the bottom of the stack. In the same way as above, each sheet film unit 4 is exposed and replaced by the next unexposed sheet film unit 4.

When the final sheet film unit has been exposed and transported from the exposure position to the bottom of the stack of sheet film units 4, all of the exposed sheet film units 4 are stacked on atop another in the pack housing 3 in order of photographing, from the top to the bottom. The counter window 37 displays an end mark "E", and the sliding lid 5 is secured to the pack housing 3 by a not-shown lock mechanism that is disposed in the counter chamber 3e to cooperate with the counter disc 18. Simultaneously, the cover 51 of the pack holder 10 is unlocked, to permit operating the knob 61 to open the cover 51.

When the cover 51 is opened, the projections 12c of the fastening member 12 are released from the pressure of the projections 58, so that the fastening member 12 springs up. Thereby the claws 12a are engaged in the holes 5c and 5d to fasten the cap 2 to the sliding lid 5. Because the protuberance 5f of the sliding lid 5 is engaged with the edge 15 of the cutout 3c of the pack housing 3, the cap 2 is thus secured to the pack housing 3. Also the ridge 57 is disengaged from the lateral groove 2a of the cap 2, so that the used sheet film pack 1 can be removed from the pack holder 10. Even if the photographer holds the sheet film pack 1 only at the grip 5a to remove it from the pack holder 10, the engagement between the protuberance 5f and the edge 15 of the cutout 3c reliably maintains the tight contact of the sliding lid 5 with the pack housing 3.

Figure 12:
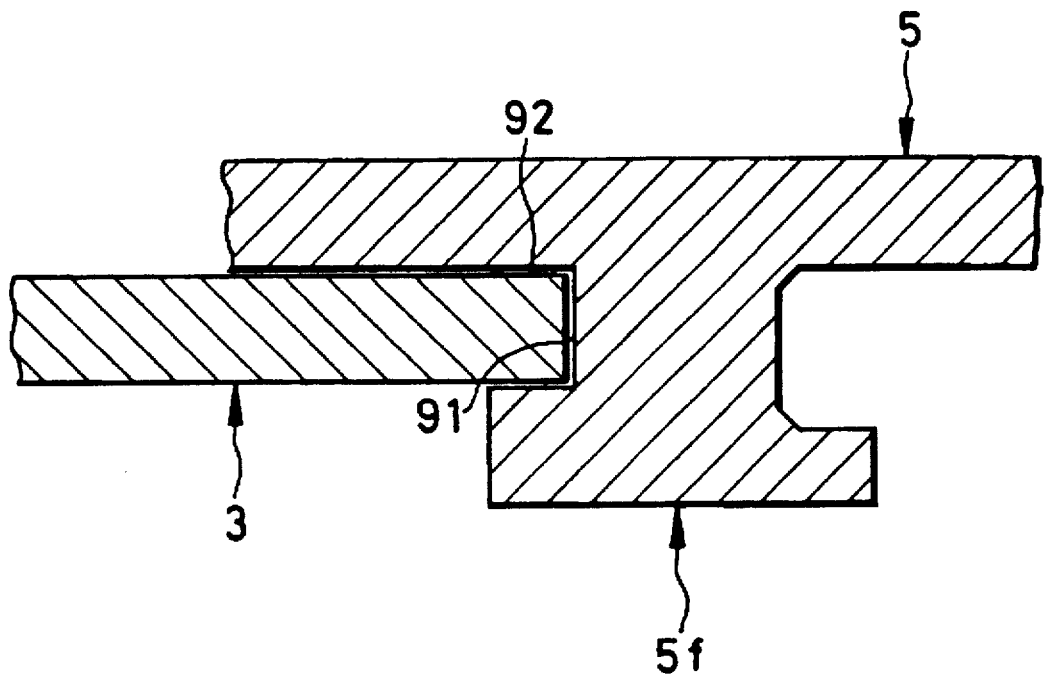
FIG. 12 is an enlarged sectional view illustrating engagement between a groove of a protuberance and an edge of the pack housing, according to another embodiment of the invention.
Figure 13:
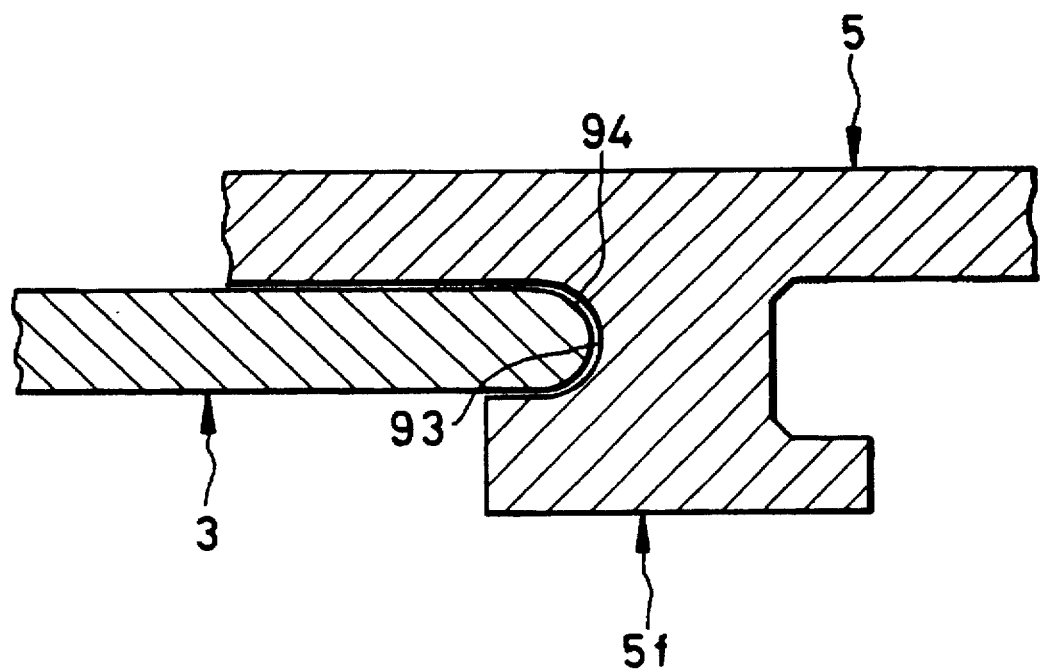
FIG. 13 is an enlarged sectional view illustrating engagement between a groove of a protuberance and an edge of the pack housing, according to a further embodiment of the invention.

Although the edge 15 of the cutout 3c is of wedge-shaped and the groove 14 of the protuberance 5f has the triangular shape in the above embodiment, the present invention is not limited to this embodiment. For example, the protuberance 5f may have a rectangular groove 91, while the cutout 3c may have a rectangular rim 92 to be engaged in the groove 91, as shown in FIG. 12. The protuberance 5f may also have a semi-cylindrical groove 93, and the cutout 3c may have a rounded edge 94 to be engaged in the groove 93, as shown in FIG. 13.

Although the protuberance 5f has the groove 13 on opposite side from the groove 14, the groove 13 may be omitted if the sheet film pack 1 is provided with another member for fastening the sliding lid 5 and the pack housing 3 to the sliding tray 52 of the pack holder 10, to permit pulling out these members 5, 3 and 52 together from the holder housing 50. It is also possible to omit the cutout 3c and provide an edge alone in the pack housing 3, for engagement with the groove 14 of the protuberance 5f. It is of course possible to provide more than one protuberance 5f. The dimensions and physical values of the sheet film pack 1 as set forth above are not limitative of the present invention, but given for example.

Thus, the present invention should not be limited to the above described embodiments but, on the contrary, various modification may be possible to those skilled in the art without departing from the scope of claims attached hereto.

What is claimed is:

1. A sheet film pack comprising:

a pack housing for receiving a plurality of sheet film units in a stack therein;

an opening formed through one side of said pack housing to allow a topmost one of said stack of sheet film units to move to an exposure position out of said pack housing;

a lid slidable on said one side of said pack housing between a closed position to close said opening in a light-tight fashion and an open position to fully open said opening;

a grip integrally formed in a leading end of said lid with respect to a sliding direction toward the open position, said grip extending beyond a leading end of said pack housing in the sliding direction when said lid is in the closed position; and at least a protuberance protruding from an inside surface of said lid in proximity to a middle portion of said grip, said protuberance being brought into engagement with an edge formed in said leading end of said pack housing when said lid moves in said closed position, to ensure light-tight contact of said lid with said pack housing.

2. The sheet film pack according to claim 1, further comprising a fastening member disposed at a trailing end of said pack housing with respect to the sliding direction toward the open position, said fastening member fastening said lid to said pack housing in the closed position.

3. A sheet film pack comprising:

a pack housing for receiving a plurality of sheet film units in a stack therein;

an opening formed through one side of said pack housing to allow a topmost one of said stack of sheet film units to move to an exposure position out of said pack housing;

a lid slidable on said one side of said pack housing between a closed position to close said opening in a light-tight fashion and an open position to fully open said housing;

a grip integrally formed in a leading end of said lid with respect to a sliding direction toward the open position, said grip extending beyond a leading end of said pack housing in the sliding direction when said lid is in the closed position; and at least a protuberance protruding from an inside surface of said lid in proximity to a middle portion of said grip, said protuberance being brought into engagement with an edge formed in said leading end of said pack housing when said lid moves in said closed position, to ensure light-tight contact of said lid with said pack housing;

wherein said protuberance has a groove whose sectional profile is complementary to a sectional profile of said edge.

4. The sheet film pack according to claim 3, further comprising a fastening member disposed at a trailing end of said pack housing with respect to the sliding direction toward the open position, said fastening member fastening said lid to said pack housing in the closed position.

5. The sheet film pack according to claim 3, wherein said edge is tapered inside of said pack housing to be a wedge-shape.

* * * * *